Figure 3:
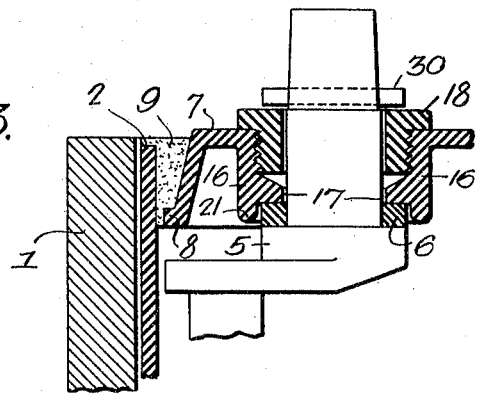
Figure 4:
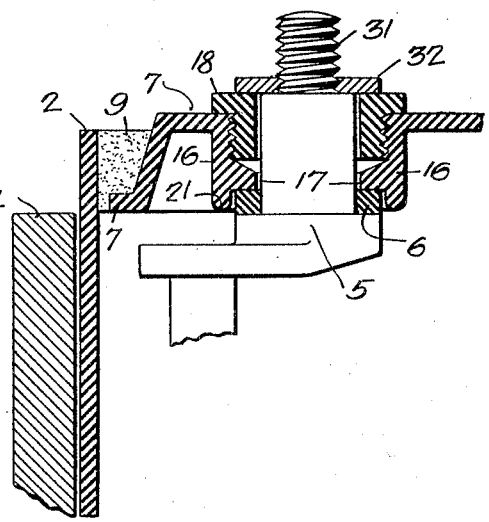

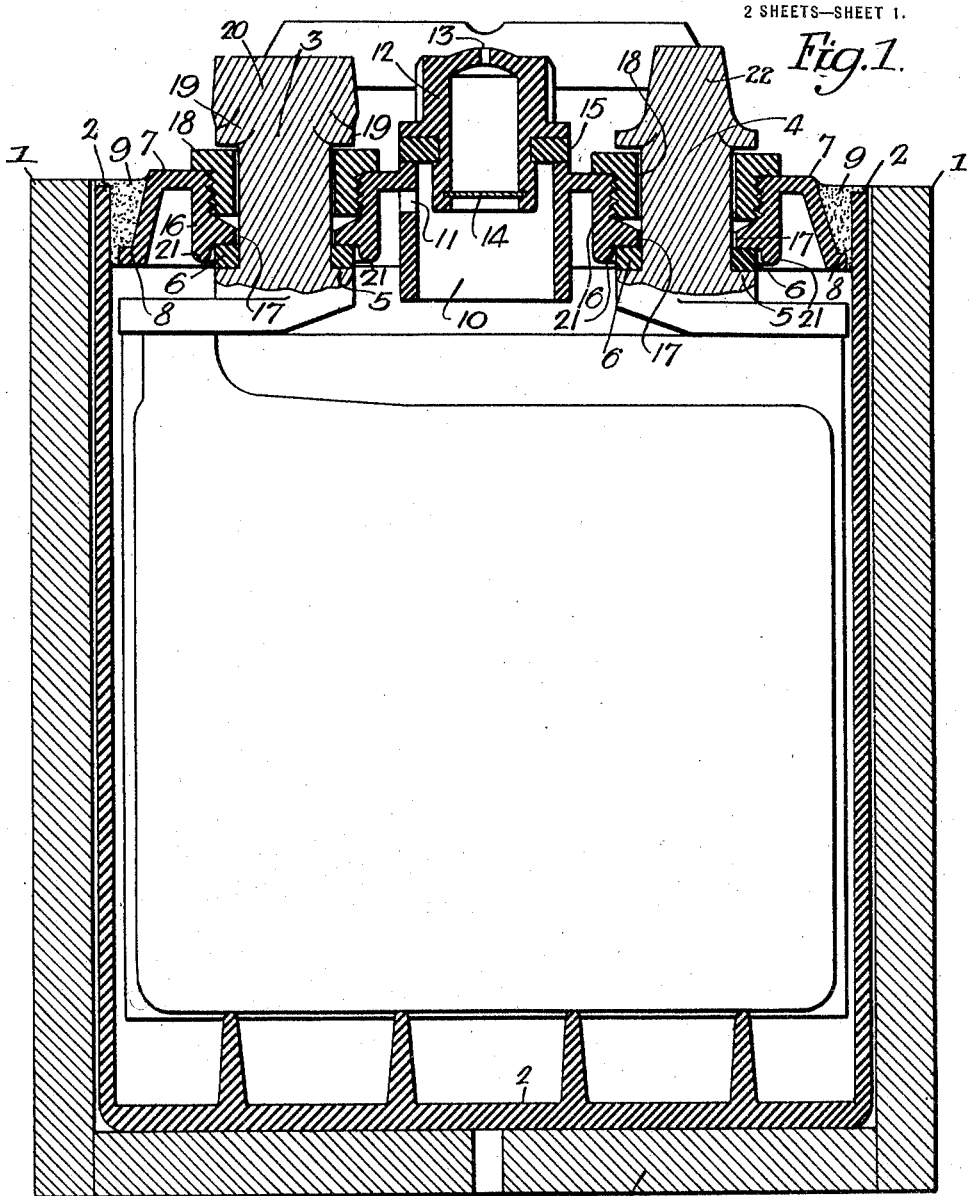
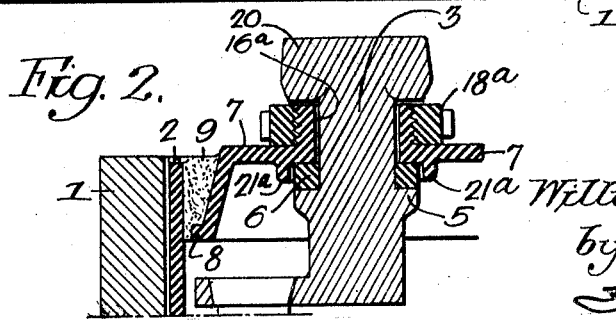

W. H. GRIMDITCH.
BATTERY CELL SEAL.
APPLICATION FILED MAR. 4, 1920.

1,402,599.

Patented Jan. 3, 1922.
2 SHEETS—SHEET 2.

Inventor-
William H. Grimditch.
by his Attorneys
Howson & Howson

UNITED STATES PATENT OFFICE.

WILLIAM H. GRIMDITCH, OF PHILADELPHIA, PENNSYLVANIA, ASSIGNOR TO PHILADELPHIA STORAGE BATTERY COMPANY, OF PHILADELPHIA, PENNSYLVANIA, A CORPORATION OF PENNSYLVANIA.

BATTERY CELL SEAL.

1,402,599. Specification of Letters Patent. Patented Jan. 3, 1922.

Application filed March 4, 1920. Serial No. 363,128.

*To all whom it may concern:*

Be it known that I, WILLIAM H. GRIMDITCH, a subject of the King of Great Britain and Ireland and the Isle of Man, (who has declared his intention of becoming a citizen of the United States,) residing in Philadelphia, Pennsylvania, have invented Battery-Cell Seals, of which the following is a specification.

One object of this invention is to provide an easily made, durable, simple and practical liquid-tight seal between two structures of which one passes through the other, and more particularly, between the cover of a battery cell and the terminal posts thereof, the invention contemplating a construction which will insure the positive and rigid connection of the parts as well as the maintenance of the correct spacing of the groups of plates within the cell.

It is further desired to provide a battery cell seal of the class noted whose construction shall be such as will permit the parts being easily and quickly disconnected when the cover is to be removed and which, by reason of its utilizing an unthreaded terminal post, shall avoid the possibility of the stripping or jamming characteristic of threads in comparatively soft metals, such as alloys of lead, and which shall include threads of such character and pitch and such an arrangement of parts as to permit of a tighter seal being made between the cover and the post than has hitherto been practical.

Another object of my invention is to provide a seal of such construction as will not easily become loosened even though subjected to prolonged jarring and whose construction and arrangement shall be such as will not require special tools for its assembly or separation.

These objects and other advantageous ends I attain as hereinafter set forth, reference being had to the accompanying drawings, in which, Fig. 1 is a vertical section taken through the terminal posts of a battery cell, illustrating my invention as applied thereto; and Figs. 2 to 5 inclusive are fragmentary vertical sections taken through one of the terminal posts, illustrating modified forms of the invention; these figures and Fig. 1 being shown with the parts assembled but not finally tightened.

In the above drawings, 1 represents the wooden casing or tray in which is mounted a battery jar 2 of hard rubber, celluloid or the like, containing groups of positive and negative plates respectively in electrical connection with a pair of terminal posts 3 and 4. The lower end portions of these posts are formed with annular flanges 5 having flat, substantially horizontal faces for the reception of soft rubber or equivalent gaskets or packing rings 6, and it is noted that said posts above the flanges are substantially cylindrical in form and pass through the cover 7 of the cell.

Said cover has a marginal flange 8 between which and the adjacent wall of the jar 2 a body of sealing compound 9 is poured after the various parts have been assembled as hereafter described, and at or near its middle the cover is formed with an aperture in which is mounted an inwardly extending sleeve 10 having in its walls one or more openings 11 opening into the highest part of the space under the cover. In said sleeve is removably or otherwise fixed a vent plug in the shape of an externally flanged bushing 12 having a relatively small vent opening 13 in its closed outer end and provided with a perforated disc or baffle 14 across its inner end. A suitable gasket 15 is confined between its flange and the top edge of the sleeve 10.

In accordance with my invention, each of the openings provided in the cover for the passage of the terminal posts 3 and 4 has mounted in it an integral sleeve 16, preferably extending downward and formed with an inwardly extending flange 17 of such internal diameter as to more or less closely fit the terminal post with which it is associated, and to extend over the gasket or packing ring 6 on the flange or gasket seat 5 of said post. This flange 17 is preferably somewhat above the lower end of the sleeve which extends around and immediately adjacent the gasket 6 so as to confine said gasket against material lateral spreading when the seal is tightened as hereinafter explained. Each of the sleeves 16 above its internal flange 17 is internally threaded for the reception of an externally flanged threaded nut 18 formed with an opening through which the post passes.

With the above described arrangement of parts, after the assembled plate elements have been placed in the jar 2 and the gaskets or packing rings 6 placed upon the terminal posts 3 and 4, the cover 7 is placed in the position shown with said posts extending through the sleeve openings 16. The nuts 18 are then placed over the two terminal posts and are screwed into said sleeves as far as they will go. A lead bushing such as indicated at 19, either with or without a connector 20, is then lead-burned or otherwise connected to the projecting upper end of each of the terminal posts so that each of these is provided with a rigidly attached projecting portion or shoulder of greater diameter than the opening through the nut 18.

The nuts 18 are then unscrewed or backed off until they forcibly engage these shoulders or flanges with the result that the cover 7 is forced downward, thus clamping and compressing each of the packing rings 6 between the flanges 5 and 17 and forming at these points liquid-proof joints between the cover 7 and the posts.

The bushing 19 is used for convenience in manufacturing so that all posts may be put through alike until near the end of the process when either a connector or terminal, such as represented at 20, may be added, or the post and bushing may be built up with molten metal by means of a mold, to form the bare terminal post 22. In some cases the bushing 19 may be omitted and the connector or terminal 20 burned directly to the post as shown in Fig. 2, so that the nut 18, when backed off, would engage the lower rim of the connector or terminal instead of the flange of the bushing 19.

As a modification of the invention, the cover 7 may have connected to or formed integral with it a sleeve 16ª projecting above its top surface and externally threaded for the reception of an internally threaded nut 18ª. In this case the under side of said cover preferably has an annular bead or rib 21ª which will prevent the lateral spreading of the packing ring or gasket 6 when the nut 18ª is backed off of the threaded sleeve 16ª into engagement with the connector 20. In this case said gasket is confined between the under side of the cover and the flange 5 on the terminal post, and as before the backing off or unscrewing of the nut acts upon the cover to force it downwardly and insure a liquid-tight seal between it and the post.

It is to be noted that means other than the connector or bushing may be utilized to provide a shoulder on the terminal post against which the nut 18 may be backed in order to make the required tight seal between the cover and said post, and as typical of such means, I have shown in Fig. 3 a pin 30 removably mounted in the terminal post so as to extend transversely thereof and project over the nut 18 when this has been screwed into the cover. When thereafter it is desired to complete the seal, the backing off of said nut into forcible engagement with the pin ends forces the cover downwardly, and tightly compresses the gasket 6 between the flange 5 of the terminal post and the flange 17 of the cover.

As another modification, I may cast or otherwise form the terminal post with a screw or stud 31 of brass or other suitable material, so that it projects beyond the end thereof, and mount on this stud a metallic or other nut 32 having a thread of opposite kind to that of the nut 18 and of such width or external diameter as to serve as a shoulder against which the nut 18 may be backed in order to form the seal as above described.

Figure 5:
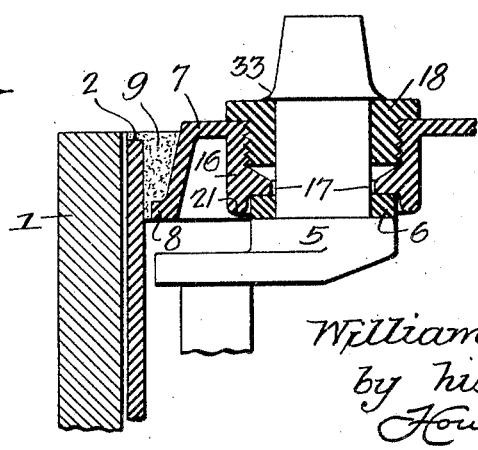

In that form of the invention shown in Fig. 5, after the nut 18 has been placed on the terminal post and screwed into the threaded recess of the cover to a suitable extent, I spin or otherwise mechanically form the metal of said post to provide a flange or collar 33 immediately above said nut, which, as in the other forms of my invention, will serve as a shoulder or abutment against which said nut may be backed in order to compress the gasket 6 between the cover and the flange of the terminal post to prevent the escape of liquid.

In all of the figures the gasket 6 is shown in the uncompressed position before the nut 18 has been backed off against the co-acting shoulder or projection. The nut 18 may be backed off, to force down the cover and compress the gasket, either before pouring the sealing compound 9 or thereafter while the compound is warm and plastic.

From the above description it will be noted that one advantage of my invention arises from the ease with which the seal may be applied or removed, for when it is desired to take off the cover of a cell, after the sealing compound 9 has been removed or loosened, it is merely necessary to remove the bushings 19 and connectors 20, by drilling or fusing, in order to automatically release the pressure on the gaskets 6 and permit of the cover being lifted off of the terminal posts. Obviously no special tools are required for this operation, and under conditions of use the nuts 18 are rigidly held, not only by reason of the friction of their threads with the threads of the sleeves 16, but also by reason of their frictional engagement with the shoulders provided by the bushings 19. There is thus little if any likelihood of their becoming loosened even though the cell be subjected to continual vibration or jarring, and owing to the fact that the terminal posts are rigidly held to the cover, the groups of plates are retained in their proper relative positions within the jar.

Moreover, owing to the fact that my sealing means involves threaded structures which are made of hard rubber or similar insulating material, having relatively good mechanical properties, and does not employ threads on the lead alloy terminal posts, there is no danger of jamming, freezing or stripping, which frequently occur when threaded structures of such soft metals as are necessarily used, in the usual type of storage battery having an acid electrolyte, are utilized in connection with the seals around the terminal posts; and since it is possible, due to the design and to the nature of the material used, to utilize relatively fine threads in the nuts 18 and the sleeves 16 in all forms of my invention, it is practicable to exert much greater pressure upon the gaskets 6 and therefore to make tighter seals or joints between the cover and the terminal posts than would ordinarily be possible.

I claim:—

1. The combination of a structure having an opening; a member passing through said opening and having two shoulders; a packing ring between one of the shoulders and the structure; and adjustable means operative between said structure and the other shoulder to cause the first shoulder to cooperate with the packing ring to form a tight joint with the structure.

2. The combination of a structure having an opening; a member passing through said opening and having two shoulders; a packing ring between one of the shoulders and the structure; and adjustable means operative between said structure and the other shoulder to cause the first shoulder to cooperate with the packing ring to form a tight joint with the structure, the latter including an annular portion for confining the packing ring against spreading.

3. The combination of a structure having an opening; a member passing therethrough and formed with shoulders on opposite sides of said structure; a ring of packing between the structure and one of said shoulders; means acting between the structure and the second shoulder for compressing at will the packing ring to make a tight joint; and means for preventing spreading of the packing ring when compressed.

4. The combination of a structure having an opening; a member passing therethrough and having shoulders on opposite sides of the structure; with means operative at will between the structure and one of the shoulders for forcing the structure toward the other shoulder to form a tight joint therewith.

5. The combination of a container having a cover provided with an opening; a member passing through said opening and formed with shoulders on opposite sides of the cover; a packing ring between the inner shoulder and the under side of the cover; and means operative at will between the outer shoulder and the cover for causing the cover to coact with the packing ring to form a seal with the inner shoulder.

6. The combination of a container having a cover; a member passing through the cover and having two shoulders respectively on opposite sides thereof; with means operative between the outer shoulder and the cover for forcibly pressing the cover at will toward the inner shoulder.

7. The combination of a container having a cover; battery plates in said container; terminal posts respectively connected to said plates and passing through openings in the cover, said posts having shoulders on opposite sides of the cover; a packing ring on each of the posts between the inner shoulder and the cover; and means acting between the second shoulder and the cover for compressing said packing ring between the cover and the other shoulder.

8. The combination in a battery of a container having a cover provided with openings; two sets of plates in the container; terminal posts respectively connected to said plates and passing through the openings in the cover, each of said posts having shoulders respectively within the container and the outside of the same; packing rings on the posts between the cover and the inner shoulders thereof; with elements threaded to the cover and operative on the outer shoulders of the posts to cause the inner shoulders to compress the packing rings against the cover.

9. The combination in a battery of a container having a cover provided with openings; two sets of plates in the container; terminal posts respectively connected to said plates and passing through the openings in the cover, each of said posts having shoulders respectively within the container and the outside of the same; packing rings on the posts between the cover and the inner shoulders thereof; elements threaded to the cover and operative on the outer shoulders of the posts for causing the inner shoulders to compress the packing rings against the cover; with means for preventing spreading of the packing rings when they are compressed.

10. The combination of a container having a cover provided with openings; battery plates in said container; terminal posts respectively connected to said plates and passing through the openings in the cover; flanges on each of the posts respectively adjacent the inner and outer faces of the cover; with annular threaded members coacting with threaded portions of the cover and with the outer shoulders of the terminal posts respectively to press the cover forcibly toward the inner shoulders.

11. The combination of a container; a cover therefor having openings provided with internally threaded sleeves and inwardly extending flanges respectively within said sleeves; battery plates in the container; terminal posts respectively connected to said plates, and extending through the cover sleeves; shoulders on each of the posts of which one extends immediately adjacent the flange of its sleeve and the other is adjacent the outside surface of the cover; with a nut threaded into each sleeve in position to cooperate with the outer shoulder of the adjacent terminal post.

12. The combination of a container; a cover therefor having openings provided with internally threaded sleeves and inwardly extending flanges respectively within said sleeves; battery plates in the container; terminal posts respectively connected to said plates and extending through the cover sleeves; shoulders on each of the posts of which one extends immediately adjacent the flange of its sleeve and the other is adjacent the outside surface of the cover; with a nut threaded into each sleeve in position to cooperate with the outer shoulder of the adjacent terminal post, the sleeve being extended below the flange thereof to provide means for preventing spreading of the packing ring.

13. A cell post having a shoulder; a cover having a threaded opening; a nut engaging the threads of said opening and held against longitudinal movement to cause the unscrewing of the nut to force the cover and the post shoulder together.

14. A cell cover having a threaded opening; a post passing through the opening; a nut engaging the threads of the opening and engaging a projection on the post to cause the cover to be clamped in position when the nut is unscrewed.

15. A cell cover having a threaded opening; a shouldered post passing through the opening; a gasket surrounding said post; with a nut engaging the threads of the opening and engaging a projection on the post to cause the gasket to be clamped between the cover and the post; when the nut is unscrewed.

16. A cell cover having a threaded opening; a post passing through the opening; a nut engaging the threads of the opening and engaging a projection on the post to cause the cover to be clamped in position when the nut is unscrewed, to form a seal between the post and the cover.

WILLIAM H. GRIMDITCH.